(12) United States Patent
Benque et al.

(10) Patent No.: US 11,789,973 B2
(45) Date of Patent: *Oct. 17, 2023

(54) SOFTWARE-DEFINED DATABASE REPLICATION LINKS

(71) Applicant: AMADEUS S.A.S., Biot (FR)

(72) Inventors: David Benque, Mouans Sartoux (FR); Marc Perreaut, Villeneuve-Loubet (FR)

(73) Assignee: AMADEUS S.A.S., Biot (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,709

(22) Filed: May 18, 2022

(65) Prior Publication Data

US 2022/0277022 A1    Sep. 1, 2022

Related U.S. Application Data

(63) Continuation of application No. 16/589,421, filed on Oct. 1, 2019, now Pat. No. 11,347,767.

(30) Foreign Application Priority Data

Oct. 4, 2018 (FR) ...................................... 1859199

(51) Int. Cl.
*G06F 16/27* (2019.01)
*G06F 9/445* (2018.01)
*H04L 67/1095* (2022.01)

(52) U.S. Cl.
CPC .......... *G06F 16/27* (2019.01); *G06F 9/44505* (2013.01); *H04L 67/1095* (2013.01)

(58) Field of Classification Search
CPC ... G06F 16/27; G06F 9/44505; H04L 67/1095
See application file for complete search history.

(56) References Cited

U.S. PATENT DOCUMENTS

| | | | |
|---|---|---|---|
| 9,805,083 B1* | 10/2017 | Johnson | G06F 16/235 |
| 2012/0109889 A1* | 5/2012 | Wu | G06F 11/3495 |
| | | | 707/613 |
| 2012/0310874 A1* | 12/2012 | Dantressangle | G06F 16/221 |
| | | | 707/600 |
| 2014/0105019 A1* | 4/2014 | Harrang | H04L 43/0888 |
| | | | 370/235 |
| 2015/0052157 A1* | 2/2015 | Thompson | G06F 16/335 |
| | | | 707/754 |
| 2019/0073670 A1* | 3/2019 | Ganesan | G06F 16/27 |
| 2019/0138533 A1* | 5/2019 | Ducott, III | G06F 16/955 |
| 2019/0235981 A1* | 8/2019 | Jakob | G06F 11/2082 |

OTHER PUBLICATIONS

Benque, David et al., "Software-Defined Database Replication Links", U.S. Appl. No. 16/589,421, filed Oct. 1, 2019.

* cited by examiner

*Primary Examiner* — Etienne P Leroux
(74) *Attorney, Agent, or Firm* — Perry + Currier

(57) ABSTRACT

Methods, systems, and computer program products for software-defined database replication for a plurality of databases. Labels are applied to each of the plurality of databases and linking rules including conditions relating to the labels are used to define database replication links.

17 Claims, 8 Drawing Sheets

```
clustergroups:
- name: ADP
  peakToken:
  - ""
  clusters:
  - name: MBOX
    instances:
    - ""
    buckets:
    - name: Rbox
      ramQuota: 0
      labels:
        Type: MCast
        Role: Rbox
    - name: Stat
      ramQuota: 0
      labels:
        Type: MCast
        Role: Stat
```

132

```
xdcrdefs:
- rule: custom
  bidirectional: false
  source:
    Type: MCast
    Role: Rbox
  destination:
    Type: BCast
    Role: Rbox
  color: red
- rule: custom
  bidirectional: false
  source:
    Type: BCast
    Role: Stat
  destination:
    Type: MCast
    Role: Stat
  color: blue
- rule: custom
  bidirectional: false
  source:
    Type: Child
    Role: Stat
  destination:
    Type: BCast
    Role: Stat
  groupOn:
    - ClusterGroup
  color: orange
```

```
clustergroups:
- name: Group1
  peakToken:
  - "LH"
  clusters:
  - name: BOX_L2
    instances:
    - ""
    buckets:
    - name: Rbox
      ramQuota: 0
      labels:
        Type: BCast
        Role: Rbox
        Level: "2"
    - name: Stat
      ramQuota: 0
      labels:
        Type: BCast
        Role: Stat
        Level: "2"
  - name: BOX_L3
    instances:
    - "0"
    - "1"
    - "2"
    - "3"
    buckets:
    - name: Rbox
      ramQuota: 0
      labels:
        Role: Rbox
        Level: "3"
    - name: Stat
      ramQuota: 0
      labels:
        Role: Stat
        Level: "3"
  - name: BOX_L4
    instances:
    - "10"
```
138

```
xdcrdefs:
- rule: custom
  bidirectional: false
  source:
    Type: MCast
    Role: Rbox
  destination:
    Type: BCast
    Role: Rbox
  color: red
- rule: tree
  bidirectional: false
  source:
    Role: Rbox
  groupOn:
  - ClusterGroup
  color: orange
```
140

FIG. 4A

SOFTWARE-DEFINED DATABASE REPLICATION LINKS

CROSS-REFERENCE TO RELATED APPLICATIONS

This application is a continuation of U.S. patent application Ser. No. 16/589,421, filed Oct. 1, 2019, which claims priority from French Patent Application No. 1859199, filed Oct. 4, 2018. The contents of the above-mentioned documents are incorporated herein by reference.

BACKGROUND

The invention is generally related to computers and computer software, and in particular to cross database replication methods, systems, and computer program products for replicating data from one database to another database.

In an all-interconnected world, all large providers of goods and services have now set up database systems holding the characteristics, specifications, and costs of their product and service offerings. Database contents are made accessible, simultaneously, to many online customers possibly from all over the world. Online customers are thus offered the opportunity to query the databases and complete commercial transactions through the use of specific online software applications that let them book and buy various products and services.

Cross-database replication (XDCR) is the frequent electronic copying of data from a database in one computer or server to a database in another computer or server, thereby improving availability and reliability of data by storing data in multiple locations. When XDCR occurs, changes to global data and site data are transferred across one or more database replication links. The result is a distributed database in which users can access data relevant to their tasks without interfering with the work of others.

While XDCR realizes many benefits, such as increased query speed and decreased communication overhead, it comes with the drawbacks of increased complexity, particularly in regards to configuration, initialization, maintenance, and modification. As the number of database replication links increases, creation and maintenance of distributed database systems often requires complex procedures, increased computer resources, and increased processing time. For example, the addition of a new server may present a significant burden on computer resources to modify and create a multitude of replication links in order to add the new server into an existing replication infrastructure.

In order to decrease the complexity of configuration and maintenance of cross-replicated distributed database systems, a continuing need exists for improved database replication solutions, as well as improved methods and computer program products for defining database replication links.

SUMMARY

In an embodiment of the invention, a system may be provided. The system may include a processor and a memory storing instructions that, when executed by the processor, may cause the system to receive at least one label that may be associated with a plurality of databases and receive at least one linking rule that may include a source label selector identifying a source label selected from the at least one label and a destination label selector identifying a destination label selected from the at least one label. The system may be configured to apply the at least one linking rule to determine at least one link between at least one source database selected from the plurality of databases and at least one destination database selected from the plurality of databases. The at least one source database may be associated with the source label and the at least one destination database may be associated with the destination label. The system may be configured to generate a first XDCR configuration file based, at least in part, on the at least one link, wherein the first XDCR configuration file may identify the at least one source database and the at least one destination database. The system may be configured to perform a first XDCR replication of the plurality of databases based at least in part on the first XDCR configuration file. Moreover, each of the plurality of databases may be associated with a database.

In another embodiment, the system may be configured to receive at least one linking condition and may apply the at least one linking rule based at least in part on satisfaction of the at least one linking condition.

In yet another embodiment, the system may be configured to re-apply the at least one linking rule to determine at least one updated link between the at least one source database and the at least one destination database, generate a second XDCR configuration file based, at least in part, on the at least one updated link, and perform a second XDCR replication of the plurality of databases based at least in part on the second XDCR configuration file.

Moreover, the system may be configured to receive a linking frequency defining a time interval between applying the at least one linking rule and re-applying the at least one linking rule. The system may be further configured to apply the at least one linking rule at a first time and re-apply the at least one linking rule at a second time, where the second time is based at least in part on the first time and at least in part on the linking frequency.

In another embodiment, the system may be configured to establish a hierarchal relationship between the at least one source database and the at least one destination database when the first XDCR replication of the plurality of databases is performed. Moreover, the at least one source label may be associated with a first hierarchy level designator and the at least one destination label may be associated with a second hierarchy level designator. The at least one linking rule may include a first hierarchy level selector identifying the first hierarchy level designator and the at least one linking rule may include a second hierarchy level selector identifying the second hierarchy level designator. The hierarchal relationship may then be established between the source database and the destination database based on the at least one link. At least one linking condition may be received, and the at least one linking rule may be applied based at least in part on satisfaction of the at least one linking condition.

According to an embodiment of the invention, a method of database replication by a computer may be provided. The computer may receive at least one label that is associated with a plurality of databases. The computer may further receive at least one linking rule that includes a source label selector identifying a source label selected from the at least one label and a destination label selector identifying a destination label selected from the at least one label. The computer may then apply the at least one linking rule to determine at least one link between at least one source database selected from the plurality of databases and at least one destination database selected from the plurality of databases. Moreover, the at least one source database may be associated with the source label and the at least one destination database may be associated with the destination label. A first XDCR configuration file may be generated by the computer based, at least in part, on the at least one link and the first XDCR configuration file may identify the at least one source database and the at least one destination database. The computer may perform a first XDCR replication of the plurality of databases based at least in part on the first XDCR configuration file. In some embodiments, the computer may receive at least one linking condition and apply the at least one linking rule based at least in part on satisfaction of the at least one linking condition.

In another embodiment, the computer may re-apply the at least one linking rule to determine at least one updated link between the at least one source database and the at least one destination database. The computer may generate a second XDCR configuration file based, at least in part, on the at least one updated link and perform a second XDCR replication of the plurality of databases based at least in part on the second XDCR configuration file. Moreover, the computer may receive a linking frequency defining a time interval between applying the at least one linking rule and re-applying the at least one linking rule. The at least one linking rule may be performed at a first time and may be re-applied at a second time where the second time is based at least in part on the first time and at least in part on the linking frequency.

In some embodiments, a hierarchal relationship may be established between the at least one source database and the at least one destination database when the first XDCR replication of the plurality of databases is performed. Moreover, the hierarchal relationship may be established between the source database and the destination database based on the at least one link. The at least one source label may be associated with a first hierarchy level designator and the at least one destination label may be associated with a second hierarchy level designator. The at least one linking rule may include a first hierarchy level selector identifying the first hierarchy level designator and a second hierarchy level selector identifying the second hierarchy level designator. At least one linking condition may be received, and the at least one linking rule may be applied based at least in part on satisfaction of the at least one linking condition.

In another embodiment of the invention, a computer program product may be provided that includes a non-transitory computer-readable storage medium including instructions. The instructions may be configured, when executed by the processor, to cause the processor to receive at least one label that may be associated with a plurality of databases and receive at least one linking rule that may include a source label selector identifying a source label selected from the at least one label and a destination label selector identifying a destination label selected from the at least one label. The system may be configured to apply the at least one linking rule to determine at least one link between at least one source database selected from the plurality of databases and at least one destination database selected from the plurality of databases. The at least one source database may be associated with the source label and the at least one destination database may be associated with the destination label. The system may be configured to generate a first XDCR configuration file based, at least in part, on the at least one link, wherein the first XDCR configuration file may identify the at least one source database and the at least one destination database. The system may be configured to perform a first XDCR replication of the plurality of databases based at least in part on the first XDCR configuration file.

The above summary may present a simplified overview of some embodiments of the invention in order to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

FIG. 3A is a first code sample illustrating an exemplary replication design with exemplary direct rules.

FIG. 4A is a second code sample illustrating an exemplary replication design with exemplary tree rules.

DETAILED DESCRIPTION

Figure 1:
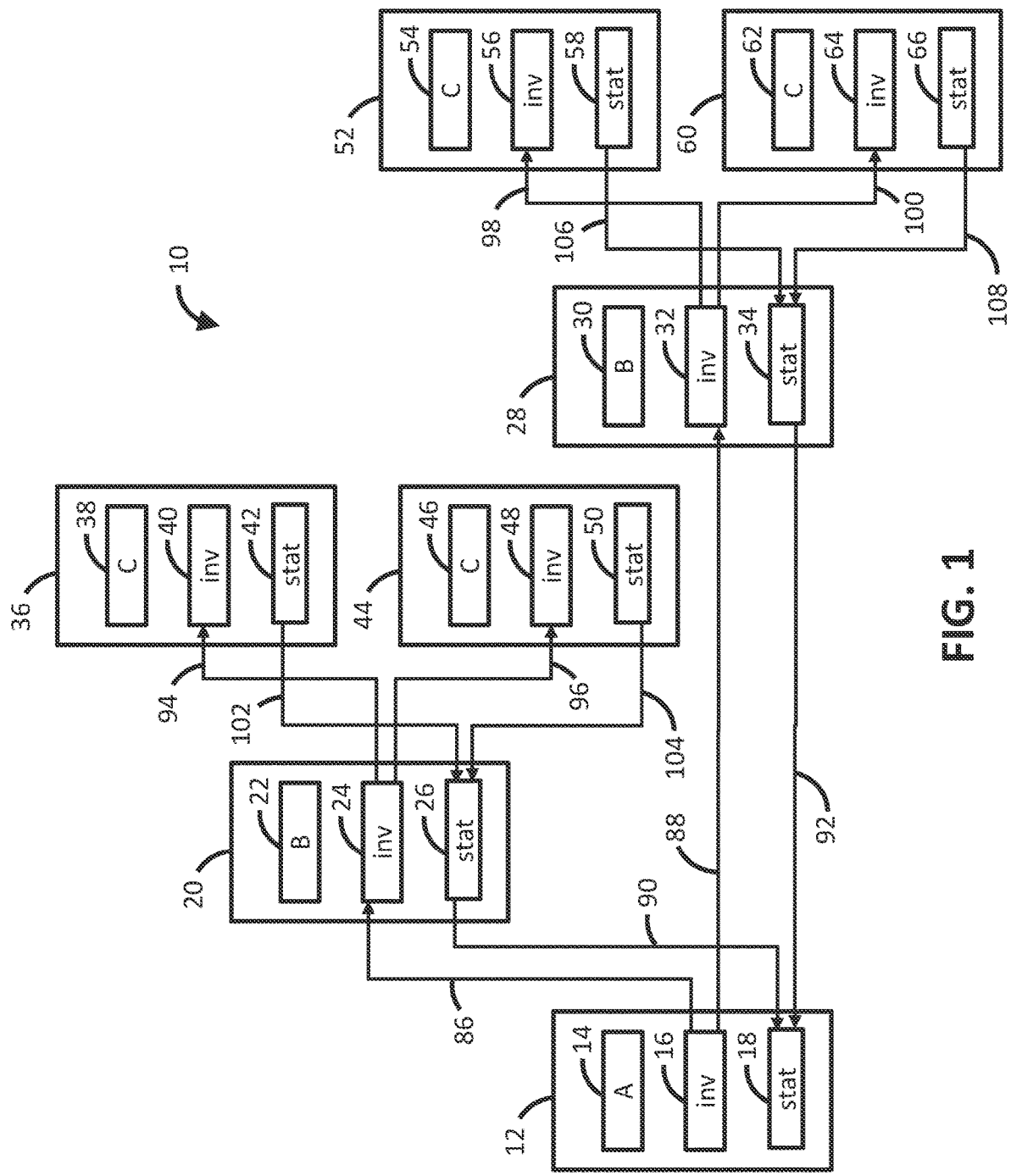
FIG. 1 is a diagram illustrating a software-defined database replication topology between a plurality of databases.

Embodiments of the invention provide methods, systems, and computer program products for cross database replication. Generally, embodiments of the invention may process labels and rules associated with a plurality of databases to generate replication links and a replication topology.

Database links may comprise and/or consist of a pointer that defines a communication path from a database server to another database server. Moreover, a link pointer may be defined as an entry in a data dictionary table and/or in replication software, e.g., Couchbase Server®. A database link connection may be one-way, e.g., database A links to database B, a database link connection may be two-way, e.g., database A links to database B and database B links to database A, or a database link connection may be circular, e.g. database A links to database B, database B links to database C, and database C links to database A. For example, in an embodiment, local users can access data from a local database that is replicated using one-way linking from a remote database. However, if the local user updates the accessed data in the local database, the remote database is only updated if there is also a replication link from the local database to the remote database, i.e., two-way linking. For this connection to occur, each database in the distributed system must have a unique identifier, for example, a global database name uniquely identifying a database server in a distributed system or a hierarchical naming convention, e.g., <data center>/<database>. For example, two datacenters may be named "DC1" and "DC2", and each data center may contain a database named "DB", the two databases may thus be uniquely identified by "DC1/DB" and "DC2/DB".

In embodiments, a database may be a remote database and, in alternative embodiments, a remote database may include one or more databases, storage, one or more servers, one or more middleware components, enterprise service buses, and/or one or more applications. Moreover, in alternative embodiments, a remote database may perform functions such as administration management, storage of live data, data synchronization of live data, storage of static data, data synchronization of caches data, polling requests, log and statistics flow, middleware, and/or administration of application program interfaces. Furthermore, servers may include log servers, administration servers, file distribution servers, and application servers; live data may include flights, counters, yields etc. In further embodiments, a database may be a logical container for documents. Moreover, XDCR can be used to replicate only a subset of the data in a database and, accordingly, subsets of data may be selected for database replication.

In other embodiments, a database may include and/or consist of at least one table or file of data, or a portion of a table or file of data. In other embodiment, a database may comprise and/or consist of a collection of tables or files, i.e., multiple tables or files may make up a database. Replication among databases thus has different meanings depending upon how the database is defined. For example, a system may include a single database which has two tables or files (i.e., two sub-databases) and the database may replicate to itself; replication thus maintains the two tables or files in the same state, where the tables or files are in the same physical location. Moreover, a system may include a single database which has one table or file partitioned into two parts and the database replicates to itself, where the first part has a plurality of records, and the second part has a plurality of records which must be kept in the same state as the first plurality of records. Replication thus may maintain the two parts of the table or file in the same state, where the two parts of the table or file are in the same physical location. In another example, a system may include two remotely located databases, where each database includes one or more tables or files and the two remotely located databases replicate themselves. Replication thus may maintain the two databases, including all of their respective tables or files, in the same state. Furthermore, each database may reside at a different location within a network.

In embodiments, XDCR may involve replicating active data to multiple, geographically diverse databases either for disaster recovery or to bring data closer to its users for faster data access. In further embodiments, database replication may include duplicating the contents of at least a portion of data records held in a source database to a target database. Replication may involve duplicating the entire contents and format of data records so that the replicated databases are identical, and thus interchangeable with each other. Moreover, replication may also involve duplicating only the contents of a portion of the data records, and not necessarily duplicating the format of the data records. Replication thus may involve data transformation or filtering wherein the source data is altered in some manner before being applied to a target database. Furthermore, replicated data may include both absolute database information as well as relative database information. In embodiments, replication and copying of data may be performed at the file level. In other embodiments, other levels of replication/copying may be performed, e.g., a disk copy operation.

With reference to FIG. 1 and in accordance with embodiments of the invention, an exemplary database environment 10 may include a database 12.

A plurality of labels, such as a label 14, label 16, and label 18 may be associated with database 12. In alternative embodiments, databases may be associated with any number of labels. Labels may be used to designate a multitude of descriptors to a particular database, including exemplary descriptors such as database hierarchy level, database type, desired flow of information, database functionality, etc.

An exemplary database environment 10 may further include additional databases: a database 20 and associated label 22, label 24, and label 26; a database 28 and associated label 30, label 32, and label 34; a database 36 and associated label 38, label 40, and label 42; a database 44 and associated label 46, label 48, and label 50; a database 52 and associated label 54, label 56, and label 58; and a database 60 and associated label 62, label 64, and label 66.

In an illustrative embodiment, the labels associated with the respective databases may assign a hierarchy level to each database. For example, the label 14 associated with database 12 may be assigned a value of "A" to designate a top or first-level hierarchy and may further signify that database 12 is a primary database. Likewise, the label 22 associated with database 20 and the label 30 associated with database 28 may be assigned a value of "B" to designate a second-level hierarchy and may further signify that database 20 and database 28 are secondary databases. Moreover, label 38 associated with database 36, label 46 associated with database 44, label 54 associated with database 52, and label 62 associated with database 60 may be assigned a value of "C" to designate a third-level hierarchy and may further signify that database 36, database 44, database 52, and database 60 are third-level databases.

An illustrative embodiment may further include labels to designate inventory or logs functionality. For example, a value of "inv" may be assigned to the label 16 associated with database 12, the label 24 associated with database 20, the label 32 associated with database 28, the label 40 associated with database 36, the label 48 associated with database 44, the label 56 associated with database 52, and the label 64 associated with database 60.

An illustrative embodiment may also include labels to designate statistics functionality. For example, a value of "stat" may be assigned to the label 18 associated with database 12, the label 26 associated with database 20, the label 34 associated with database 28, the label 42 associated with database 36, the label 50 associated with database 44, the label 58 associated with database 52, and the label 66 associated with database 60.

In an illustrative embodiment, conditions relating to the labels may be established to identify databases based on their assigned labels, eliminating the necessity of referring to databases based on their unique identifiers. Thus, database links may be established based on conditions relating to the labels. For example, links may be automatically established based on conditions requiring databases having an associated label value of "A" and a label value of "inv" to link to databases associated with a label value of "B" and a label value of "inv", e.g., replication link 86 may be established from database 12 to database 20 and replication link 88 may be established from database 12 to database 28. In another example, links may be automatically established based on conditions requiring databases having an associated label value of "B" and a label value of "stat" to link to databases associated with a label value of "A" and a label value of "stat", e.g., replication link 90 may be established from database 20 to database 12 and replication link 92 may be established from database 28 to database 12.

In yet another example, links may be automatically established based on conditions requiring databases having an associated label value of "B" and a label value of "inv" to link to databases associated with a label value of "C" and a label value of "inv", e.g., in an automatically balanced replication system, replication link 94 may be established from database 20 to database 36, replication link 96 may be established from database 20 to database 44, replication link 98 may be established from database 28 to database 52, and replication link 100 may be established from database 28 to database 60. Alternatively, any other combination of replication links could be performed, as long as the conditions are satisfied.

In another example, links may be automatically established based on conditions requiring databases having an associated label value of "C" and a label value of "stat" to link to databases associated with a label value of "B" and a label value of "stat", e.g., in an automatically balanced replication system, replication link 102 may be established from database 36 to database 20, replication link 104 may be established from database 44 to database 20, replication link 106 may be established from database 52 to database 28, and replication link 108 may be established from database 60 to database 28. Alternatively, any other combination of replication links could be performed, as long as the conditions are satisfied.

Figure 2:
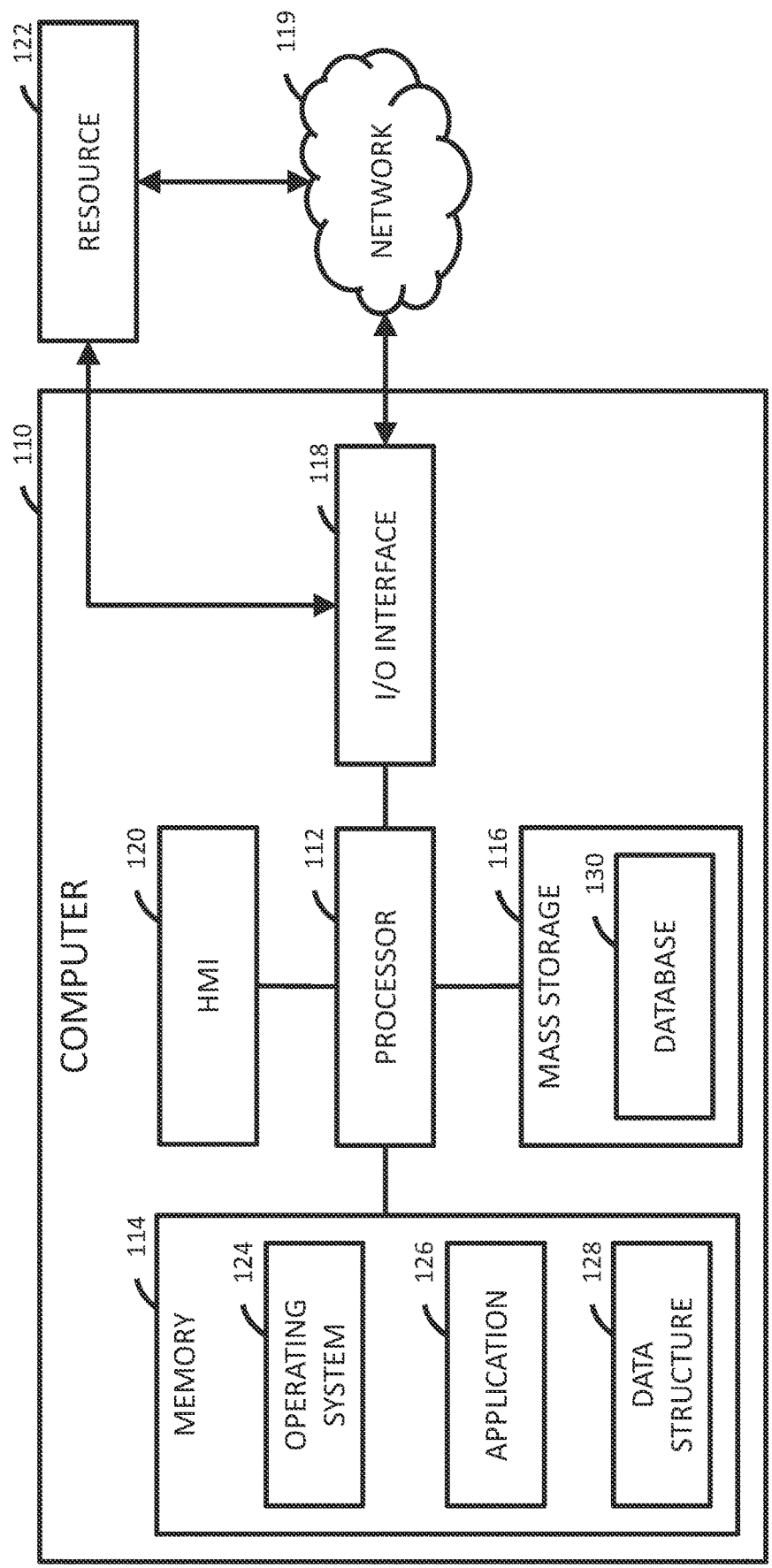
FIG. 2 is a schematic view of an exemplary computer system of FIG. 1.

With reference to FIG. 2, the XDCR replication system may be implemented on one or more computer devices or systems, such as exemplary computer system 110. The computer system 110 may include a processor 112, a memory 114, a mass storage memory device 116, an input/output (I/O) interface 118, and a Human Machine Interface (HMI) 120. The computer system 110 may also be operatively coupled to one or more external resources 122 via the network 119 or I/O interface 118. External resources may include, but are not limited to, servers, databases, mass storage devices, peripheral devices, cloud-based network services, or any other suitable computer resource that may be used by the computer system 110.

The processor 112 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 114. The memory 114 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 116 may include data storage devices such as a hard drive, optical drive, tape drive, non-volatile solid state device, or any other device capable of storing information.

The processor 112 may operate under the control of an operating system 124 that resides in the memory 114. The operating system 124 may manage computer resources so that computer program code embodied as one or more computer software applications, such as an application 126 residing in memory 114, may have instructions executed by the processor 112. In an alternative embodiment, the processor 112 may execute the application 126 directly, in which case the operating system 124 may be omitted. One or more data structures 128 may also reside in memory 114, and may be used by the processor 112, operating system 124, or application 126 to store or manipulate data.

The I/O interface 118 may provide a machine interface that operatively couples the processor 112 to other devices and systems, such as the network 119 or the one or more external resources 122. The application 126 may thereby work cooperatively with the network 119 or the external resources 122 by communicating via the I/O interface 118 to provide the various features, functions, applications, processes, or modules comprising embodiments of the invention. The application 126 may also have program code that is executed by the one or more external resources 122, or otherwise rely on functions or signals provided by other system or network components external to the computer system 110. Indeed, given the nearly endless hardware and software configurations possible, persons having ordinary skill in the art will understand that embodiments of the invention may include applications that are located externally to the computer system 110, distributed among multiple computers or other external resources 122, or provided by computing resources (hardware and software) that are provided as a service over the network 119, such as a cloud computing service.

The HMI 120 may be operatively coupled to the processor 112 of computer system 110 in a known manner to allow a user to interact directly with the computer system 110. The HMI 120 may include video or alphanumeric displays, a touch screen, a speaker, and any other suitable audio and visual indicators capable of providing data to the user. The HMI 120 may also include input devices and controls such as an alphanumeric keyboard, a pointing device, keypads, pushbuttons, control knobs, microphones, etc., capable of accepting commands or input from the user and transmitting the entered input to the processor 112.

A database 130 may reside on the mass storage memory device 116, and may be used to collect and organize data used by the various systems and modules described herein. The database 130 may include data and supporting data structures that store and organize the data. In particular, the database 130 may be arranged with any database organization or structure including, but not limited to, a relational database, a hierarchical database, a network database, a database grouping, or a database container, or combinations thereof. A database management system in the form of a computer software application executing as instructions on the processor 112 may be used to access the information or data stored in records of the database 130 in response to a query, where a query may be dynamically determined and executed by the operating system 124, other applications 126, or one or more modules.

With reference to FIG. 3A, a first code sample illustrating an exemplary replication design 132 with exemplary direct rules 134 is provided. As shown, cluster groups (i.e. database groups), clusters (i.e. databases), and buckets (i.e. database containers) may be created and assigned respective "name" values by replication design 132. In the illustrative exemplary embodiment, a cluster group is assigned a value of "ADP", a cluster is assigned a value of "MBOX", and two buckets are assigned respective values of "Rbox" and "Stat". Labels may be applied or re-applied to a cluster group, cluster, and/or bucket as necessary, e.g., when a change is made to the database system or when the database is created such as initial setup or addition of a database server. Exemplary labels are shown, including "Type" and "role". In the exemplary embodiment, the "Rbox" bucket label "Type" is assigned a value of "MCast" and the "Rbox" bucket label "Role" is assigned a value of "Rbox". Furthermore, the "Stat" bucket label "Type" is assigned a value of "MCast" and the "Stat" bucket label "Role" is assigned a value of "Stat".

FIG. 3A further provides exemplary direct rules 134 for direct XDCR links using label selectors for source, destination, and level. In the illustrative embodiment, the exemplary XDCR rule definition "xdcrdefs" is used to define two rules. As discussed supra, the rules may be assigned a direction, e.g., unidirectional or bidirectional, and may provide conditions associated with database labels for the source and destination parameters. In the illustrative embodiment first custom rule is created, the first custom rule being unidirectional, i.e., "bidirectional false", having a source with "Type" label of value "MCast" and "Role" label equal to "Rbox" and a destination with "Type" label of value "BCast" and "Role" label equal to "Rbox". The second illustrative custom rule is also unidirectional and is used to establish a direct structure. The second illustrative "custom" rule assigns a source with "Type" label of value "BCast" and "Role" label equal to "Stat" and a destination with "Type" label of value "MCast" and "Role" label equal to "Stat". The second illustrative custom rule is also unidirectional and is used to establish a direct structure. A third illustrative "custom" rule assigns a source with "Type" label of value "Child" and "Role" label equal to "Stat" and a destination with "Type" label of value "BCast" and "Role" label equal to "Stat".

Figure 3B:
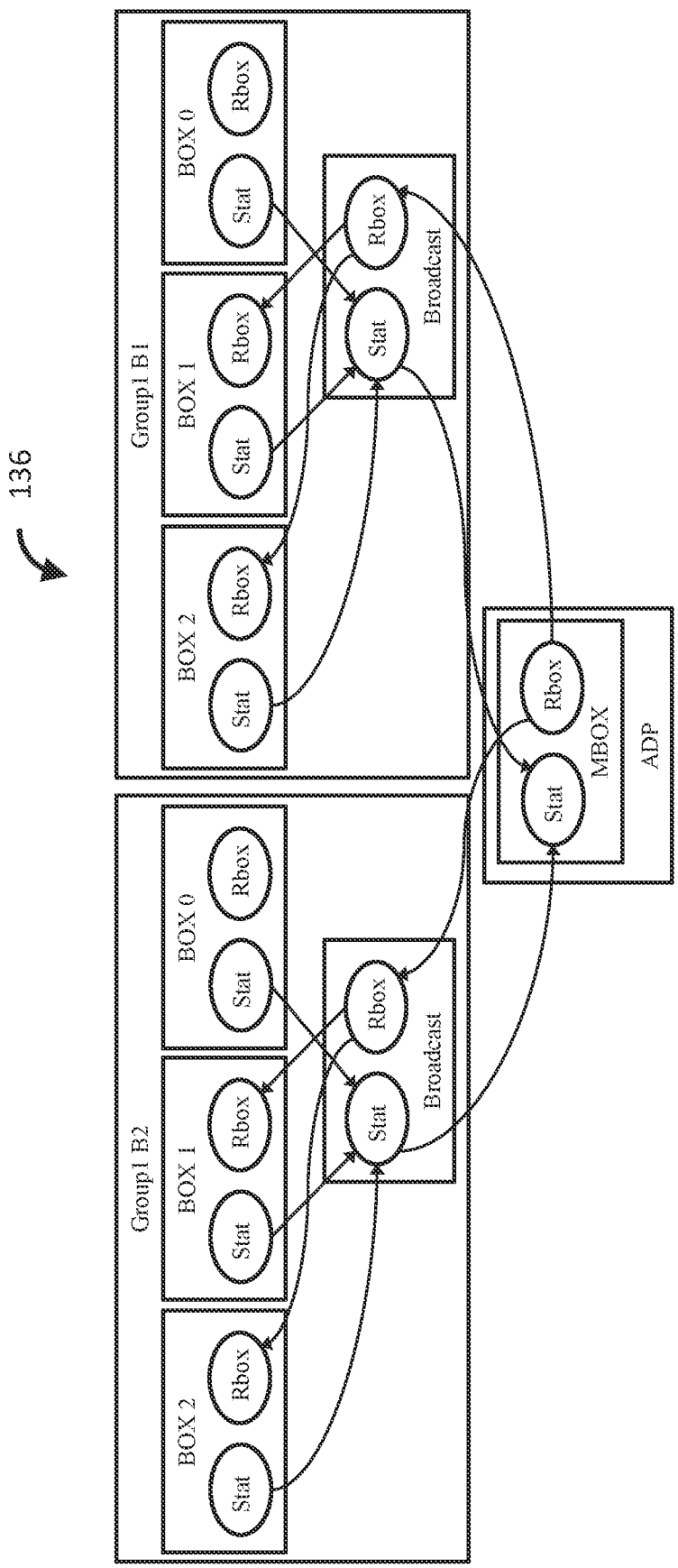
FIG. 3B is a schematic illustrating an exemplary database map corresponding to the exemplary replication design and exemplary direct rules of FIG. 3A.

FIG. 3B shows an exemplary database map 136 with direct links established between the databases based on the replication design 132 and direct rules 134. FIG. 3B further illustrates a plurality of cluster groups, including "Group1 B2", "Group1 B1", and "ADP". The cluster group "ADP", for example, is defined in the replication design 132 of FIG. 3A. The replication design 132 of FIG. 3A also defines the cluster "MBOX" and buckets, "Stat" and "Rbox", as illustrated in FIG. 3B. FIG. 3B further shows direct links established according to the direct rules 134 as applied to the database labels defined in the replication design 132. For example, as illustrated in FIG. 3B, the "Stat" buckets of the respective clusters are directly linked to each other in a direction towards the "ADP" cluster group; the "Rbox" buckets are directly linked to each other in a direction away from the "ADP" cluster group.

With reference to FIG. 4A, a second code sample illustrating an exemplary tree replication design 138 with exemplary tree rules definition 140 is provided. As shown, cluster groups, clusters, and buckets may be created and assigned respective "name" values. In the illustrative exemplary embodiment, a tree replication design 138 assigns a value of "Group1" to a cluster group. A first cluster is assigned a value of "BOX_L2" with two associated buckets assigned respective values of "Rbox" and "Stat". The exemplary labels applied to the "Rbox" bucket of the "BOX_L2" cluster include a "Type" label assigned a value of "BCast", a "Role" label assigned a value of "Rbox", and a "Level" label assigned a value of "2". The exemplary labels applied to the "Stat" bucket of the "BOX_L2" cluster include a "Type" label assigned a value of "BCast", a "Role" label assigned a value of "Stat", and a "Level" label assigned a value of "2". A second cluster is assigned a value of "BOX_L3" with two associated buckets assigned respective values of "Rbox" and "Stat". The exemplary labels applied to the "Rbox" bucket of the "BOX_L3" cluster include a "Role" label assigned a value of "Rbox", and a "Level" label assigned a value of "3". The exemplary labels applied to the "Stat" bucket of the "BOX_L3" cluster include a "Role" label assigned a value of "Stat", and a "Level" label assigned a value of "3".

FIG. 4A further provides exemplary tree rules definition 140 for tree XDCR links using label selectors for source, destination, and level. In the illustrative embodiment, the exemplary XDCR rule definition "xdcrdefs" is used to define two rules. As discussed supra, the rules may be assigned a direction, e.g., unidirectional or bidirectional, and may provide conditions associated with database labels for the source and destination parameters. In the illustrative embodiment first custom rule is created, the first custom rule being unidirectional, i.e., "bidirectional false", having a source with "Type" label of value "MCast" and "Role" label equal to "Rbox" and a destination with "Type" label of value "BCast" and "Role" label equal to "Rbox". The second illustrative custom rule is also unidirectional and is used to establish a tree structure.

Figure 4B:
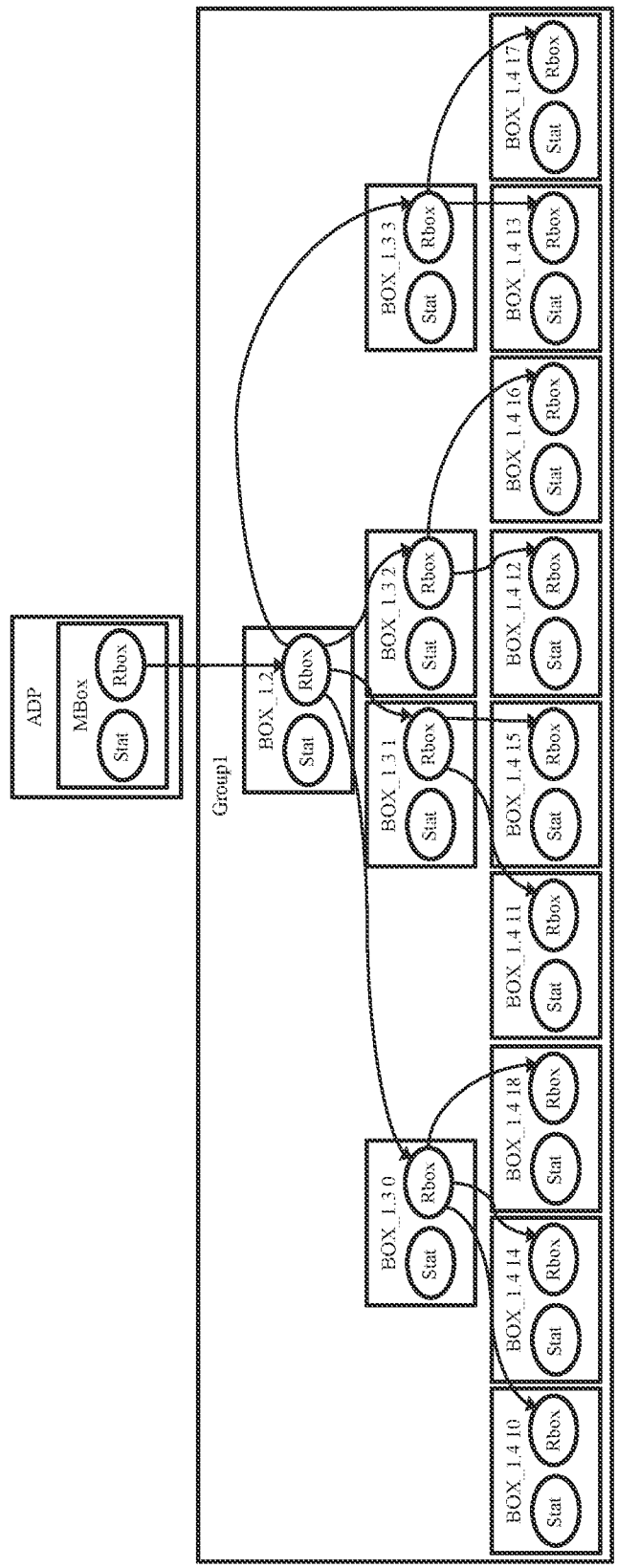
FIG. 4B is a schematic illustrating an exemplary database map corresponding to the exemplary replication design and exemplary tree rules of FIG. 4A.

FIG. 4B illustrates an exemplary database map 142 with tree links established between the databases based on the tree replication design 138 and tree rules definition 140. FIG. 4B further illustrates a plurality of cluster groups, including "Group1", and "ADP". The cluster group "Group1", for example, is defined in the replication design 138 of FIG. 4A. The replication design 138 of FIG. 4A also defines the clusters "BOX_L2", "BOX_L3", and "BOX_L4", as well as buckets, "Rbox" and "Stat", as illustrated in FIG. 4B. FIG. 4B further shows tree links established according to the tree rules definition 140 as applied to the database labels defined in the tree replication design 138. For example, as illustrated in FIG. 4B, the "Rbox" buckets of the respective clusters are linked to each other in a direction away from the "ADP" cluster group according to the hierarchy of the tree structure defined by the tree replication design 138.

Figure 5:
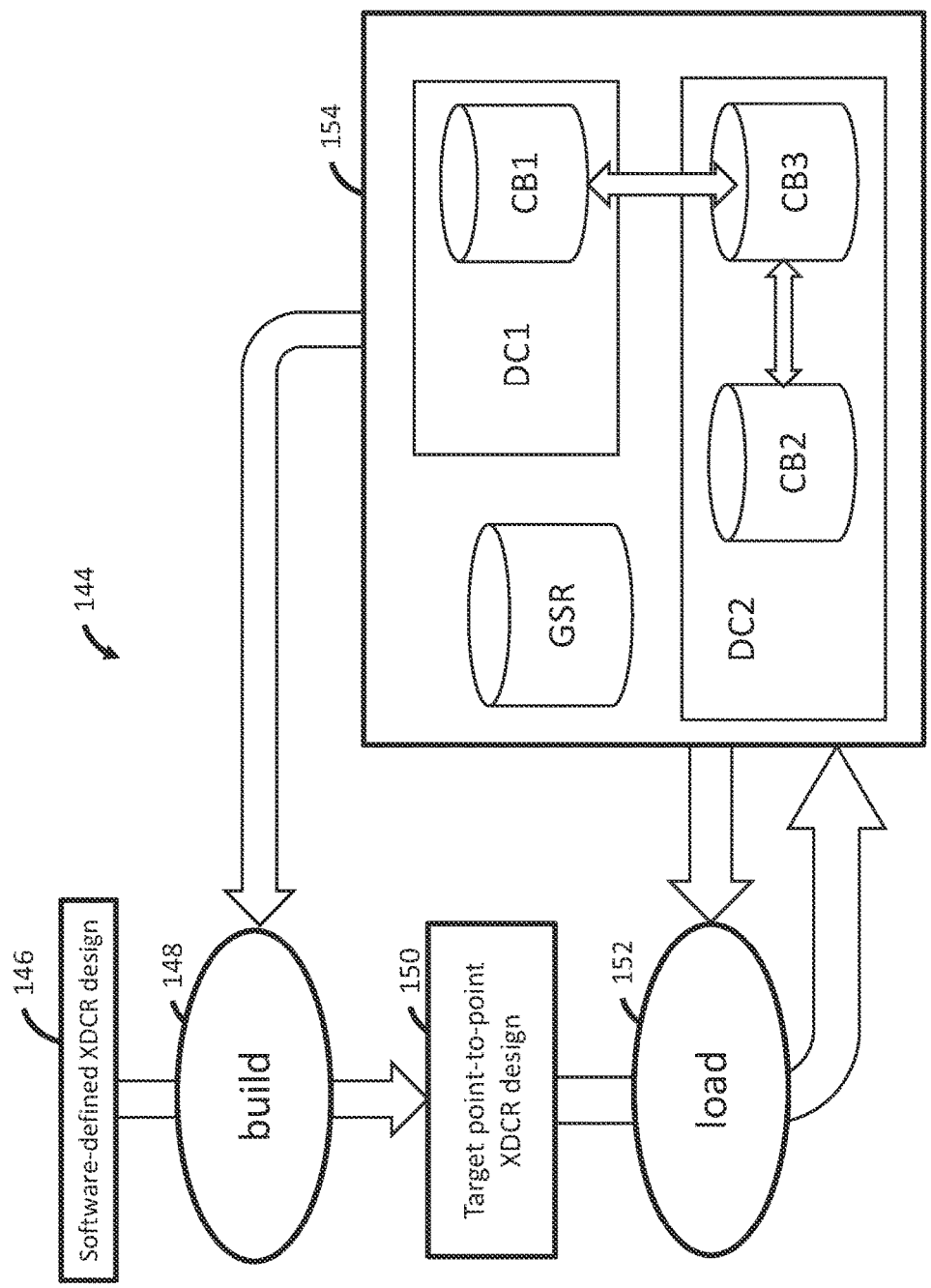
FIG. 5 is a flowchart illustrating a sequence of operations that may be performed by an exemplary database system to perform software-defined XDCR replication.

Turning now to FIG. 5, a process 144 may be performed in accordance with embodiments of the invention to perform software-defined XDCR replication.

In step 146, a software-defined XDCR design as illustrated in FIG. 3 and FIG. 4 is provided as an input. The software-defined XDCR design may include unique identifiers for database groups as well as the databases contained within the individual database groups. The software-defined XDCR design may further include one or more labels to be applied to the databases. The labels may relate to database attributes such as type and/or role. The labels may further include a level attribute for tree design XDCR database configuration. In an embodiment, the input file format is YAML, i.e., "Yet Another Multicolumn Layout", but in alternative embodiments, may be JSON, XML, or any other data serialization language. Likewise, in an embodiment, the Go programming language is used to parse and process the software-defined XDCR design, but one of ordinary skill in the art will appreciate that any file format or programming language may be used.

In step 148, the system translates the XDCR design into a point-to-point XDCR design comprising a list of XDCR parameters, e.g. source database, destination database, and type of link. By using an input file referencing labels, as well as source and/or destination instructions, the system may eliminate the need to reference individual databases. Thus, in step 150, the system may translate the input file containing database label information to a target point-to-point XDCR design that can be used by an XDCR replication program. The target point-to-point design may provide unique identifiers and configuration on a per database basis, including all databases in a database. The XDCR Design may further configure all nodes within any given source database to communicate with all the nodes on any given destination database. Destination databases for XDCR may be named in the XDCR configuration and the XDCR configuration may further include destination database references that point to IP addresses of nodes in the destination databases. Moreover, the XDCR configuration may include a unique database identifier for each database, as well as the role the database plays, e.g., master, replica, or XDCR.

In step 152, the target point-to point XDCR design may be loaded into a software replication program. In an embodiment, a load tool is used to parse the point-to-point XDCR design (translated in step 150), retrieve the existing XDCR topology (implemented in step 154), compare the target XDCR design and the existing XDCR topology, and compute the necessary XDCR topology changes, e.g. creation of XDCR links, update of XDCR link parameters, or deletion of XDCR links. The load tool may then call an application program interface (API) of a software replication program to implement the target XDCR topology, thereby creating new XDCR links, updating the parameters of existing XDCR links, and/or deleting existing XDCR links based on the point-to-point XDCR design.

In step 154, the database system may be linked based on the loaded target point-to-point XDCR design. The replication process may be performed in multiple parallel streams; each unique partition on one database may send a binary log of completed transactions to the other databases. Moreover, each database may send a snapshot of existing data to the other. Once the snapshot is received and applied (and the two databases are in sync), the partitions may start sending binary logs of transaction results to keep the databases synchronized. When XDCR performs replication, it exchanges data between databases. Replication may also be ongoing, such that replications that are currently configured and operating may be monitored and/or modified, including monitoring the current configuration, current status, and the last time a replication process was triggered for each configured replication.

Figure 6:
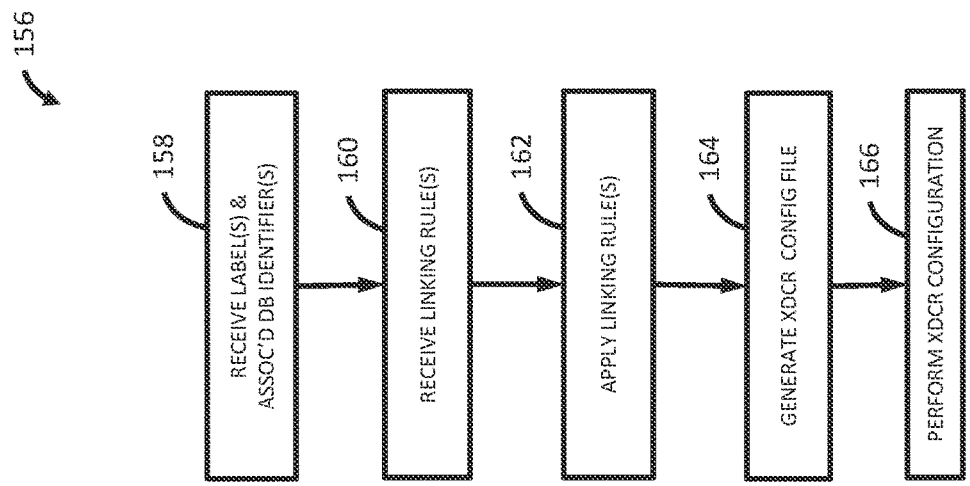
FIG. 6 is a flowchart illustrating an exemplary method to perform software-defined database replication for one or more databases.

Turning now to FIG. 6, a method 156 may be performed by the computer system 110 to establish XDCR replication in accordance with embodiments of the invention. In step 158, the computer system 110 may receive one or more labels and associated database identifiers. The database identifier may be a unique name or descriptor for an associated database. Each label may include a sequence of characters that identifies an attribute or property of one or more associated databases, or may simply serve as a descriptor for one or more associated databases.

In step 160, the computer system 110 may receive one or more linking rules, including conditional statements relating to at least one of the labels associated with the database identifiers. Linking rules may include one or more source labels to identify one or more source databases. Likewise, linking rules may include one or more destination labels to identify destination databases.

In step 162, the computer system 110 may apply the one or more linking rules to the labels, thereby establishing desired linking connections between the databases. Thus, source databases may be linked to destination databases. Thus the databases are interlinked and may become more useful through semantic queries and/or data exchange. Moreover, linking the databases may enable data from the linked databases to be connected and queried. In an embodiment, the labels are invisible to the API of the software replication program and are only visible in the software-defined XDCR design.

In step 164, the computer system 110 may generate an XDCR configuration file. The XDCR configuration file may be formatted to facilitate compatibility with data replication software. The XDCR configuration file may include linked database identifiers and, furthermore, the XDCR configuration file may provide all or part of the settings needed to perform the XDCR configuration.

In step 166, the computer system 110 may perform the XDCR configuration. XDCR configuration may configure the system to perform XDCR replication, i.e., replicating data across databases.

Embodiments of the invention may provide methods, systems, and computer program products for cross database replication of databases associated with travel services and managing inventory availability for travel inventory items. In the airline industry, examples of databases include those databases that hold the inventory of airlines. These databases are used to keep track in real-time of the actual seat capacity and the current state of reservations along with the configurations of the fleet of flights operated by a given airline.

More precisely, an airline's inventory usually contains all flights with their available seats and is generally divided into service classes (e.g., first, business, or economy class) and many booking classes, for which different prices and booking conditions apply. One of the functions of the inventory management is inventory control. Inventory control steers how many seats are available in the different booking classes, for instance by opening and closing individual booking classes offered for sale. In combination with the fares and booking conditions stored in a Fare Quote System, the price for each sold seat is determined. In most cases, inventory control has an interface to an airline's Revenue Management System to support an optimization of the offered booking classes in response to changes in demand. Users may access the inventory of an airline through an availability application having a display and graphical user interface. The inventory contains all offered flights for origin-destination pairs with their available seats in the different booking classes.

Airline inventory databases are usually managed by airlines. Airline inventory databases can also be set up by companies that provide travel services to many actors of the travel industry including the airlines, the traditional travel agencies, and other online travel service providers. Some inventories are directly run by airlines and are interfaced with a global distribution systems (GDS) or a central reservation system (CRS).

Accordingly, because computer technology is increasingly used in the travel industry to manage, support, book, reserve, and process travel reservations as well as the associated data, the travel industry has a need to maintain the reliability, availability, and integrity of data and databases.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system comprising:
a memory; and
a processor configured to:
   receive, for each of a plurality of databases, a set of labels defining respective attributes of the database, each label containing a value for the corresponding attribute;
   receive a linking rule that includes:
      (i) a source label selector identifying a source attribute from the database attributes, and a source value for the source attribute, and
      (ii) a destination label selector identifying a destination attribute from the database attributes, and a destination value for the destination attribute;
   apply the linking rule to determine a link between a source database selected from the plurality of databases and a destination database selected from the plurality of databases, wherein the set of labels of the source database includes a label defining the source attribute and containing the source value, and wherein the set of labels of the destination database includes a label defining the destination attributed and containing the destination value;
   generate a first cross database replication (XDCR) configuration file based on the link and identifying the at source database and the destination database; and
   perform a first XDCR of the plurality of databases based on the first XDCR configuration file;
   re-apply the linking rule to determine an updated link between the source database and the destination database;
   generate a second XDCR configuration file based on the updated link; and
   perform a second XDCR replication of the plurality of databases based on the second XDCR configuration file.

2. The system of claim 1 wherein the processor is further configured to:
   prior to applying the linking rule, receive at least one linking condition; and
   apply the linking rule in response to satisfaction of the linking condition.

3. The system of claim 1 wherein the processor is further configured, to re-apply the linking rule, to:
  receive a linking frequency defining a time interval between applying the linking rule and re-applying the linking rule; and
  in response to applying the linking rule at a first time, re-apply the linking rule at a second time based on the first time and on the linking frequency.

4. The system of claim 1 wherein the processor is further configured to:
  establish a hierarchal relationship between the source database and the destination database when the first XDCR replication of the plurality of databases is performed.

5. The system of claim 4, wherein
  the source attribute and the destination attribute are hierarchical attributes;
  the source value and the destination value are hierarchical level designators; and
  wherein the processor is configured to establish the hierarchical relationship based on the link.

6. The system of claim 4 wherein the processor is further configured to:
  prior to applying the linking rule, receive at least one linking condition; and
  apply the linking rule in response to satisfaction of the linking condition.

7. A method comprising:
  receiving, at a computer, for each of a plurality of databases, a set of labels defining respective attributes of the database, each label containing a value for the corresponding attribute;
  receiving, at the computer, a linking rule that includes;
    (i) a source label selector identifying a source attribute from the database attributes, and a source value for the source attribute, and
    (ii) a destination label selector identifying a destination attribute from the database attributes, and a destination value for the destination attribute;
  applying, at the computer, the linking rule to determine a link between a source database selected from the plurality of databases and a destination database selected from the plurality of databases, wherein the set of labels of the source database includes a label defining the source attribute and containing the source value, and wherein the set of labels of the destination database includes a label defining the destination attributed and containing the destination value;
  generating a first cross database replication (XDCR) configuration file based on the link and identifying the at source database and the destination database; and
  performing a first XDCR of the plurality of databases based on the first XDCR configuration file;
  re-applying, by the computer, the linking rule to determine an updated link between the source database and the destination database;
  generating a second XDCR configuration file based on the updated link; and
  performing a second XDCR replication of the plurality of databases based on the second XDCR configuration file.

8. The method of claim 7 further comprising:
  prior to applying the linking rule, receiving at least one linking condition; and
  applying the linking rule in response to satisfaction of the linking condition.

9. The method of claim 7, wherein re-applying the linking rule comprises:
  receiving a linking frequency defining a time interval between applying the linking rule and re-applying the linking rule; and
  in response to applying the linking rule at a first time, re-applying the linking rule at a second time based on the first time and on the linking frequency.

10. The method of claim 7, further comprising:
  establishing a hierarchal relationship between the source database and the destination database when the first XDCR replication of the plurality of databases is performed.

11. The method of claim 10 wherein:
  the source attribute and the destination attribute are hierarchical attributes;
  the source value and the destination value are hierarchical level designators; and
  establishing the hierarchical relationship is based on the link.

12. The method of claim 10 further comprising:
  prior to applying the linking rule, receiving at least one linking condition; and
  applying the linking rule in response to satisfaction of the linking condition.

13. A non-transitory computer-readable medium storing instructions executable by a processor to:
  receive, for each of a plurality of databases, a set of labels defining respective attributes of the database, each label containing a value for the corresponding attribute;
  receive a linking rule that includes:
    (i) a source label selector identifying a source attribute from the database attributes, and a source value for the source attribute, and
    (ii) a destination label selector identifying a destination attribute from the database attributes, and a destination value for the destination attribute;
  apply the linking rule to determine a link between a source database selected from the plurality of databases and a destination database selected from the plurality of databases, wherein the set of labels of the source database includes a label defining the source attribute and containing the source value, and wherein the set of labels of the destination database includes a label defining the destination attributed and containing the destination value;
  generate a first cross database replication (XDCR) configuration file based on the link and identifying the at source database and the destination database; and
  perform a first XDCR of the plurality of databases based on the first XDCR configuration file;
  re-apply the linking rule to determine an updated link between the source database and the destination database;
  generate a second XDCR configuration file based on the updated link; and
  perform a second XDCR replication of the plurality of databases based on the second XDCR configuration file.

14. The non-transitory computer-readable medium of claim 13 wherein execution of the instructions configures the processor to:
  prior to applying the linking rule, receive at least one linking condition; and
  apply the linking rule in response to satisfaction of the linking condition.

15. The non-transitory computer-readable medium of claim 13 wherein execution of the instructions configures the processor, to re-apply the linking rule, to:
- receive a linking frequency defining a time interval between applying the linking rule and re-applying the linking rule; and
- in response to applying the linking rule at a first time, re-apply the linking rule at a second time based on the first time and on the linking frequency.

16. The non-transitory computer-readable medium of claim 13 wherein execution of the instructions configures the processor to;
- establish a hierarchal relationship between the source database and the destination database when the first XDCR replication of the plurality of databases is performed.

17. The non-transitory computer-readable medium of claim 16, wherein
- the source attribute and the destination attribute are hierarchical attributes;
- the source value and the destination value are hierarchical level designators; and
- wherein execution of the instructions configures the processor to establish the hierarchical relationship based on the link.

* * * * *